Aug. 31, 1965 R. A. WOOD 3,204,117

DIFFERENTIAL AMPLIFIER AND LEVEL DETECTOR

Filed Sept. 17, 1962

INVENTOR.
RICHARD A. WOOD
BY Eckhoff & Slick
ATTORNEYS

United States Patent Office 3,204,117

Patented Aug. 31, 1965

3,204,117

DIFFERENTIAL AMPLIFIER AND LEVEL DETECTOR

Richard A. Wood, Sunnyvale, Calif., assignor to Illumitronic Systems Corporation, a corporation of California Filed Sept. 17, 1962, Ser. No. 224,142
2 Claims. (Cl. 307—88.5)

This invention relates to a novel differential amplifier and level detector embodying a blocking oscillator circuit. More particularly, the invention relates to a pulse amplifier having good temperature compensation and employing transistor elements wherein the transistors function largely as switching elements so that the output of the circuit depends primarily on the characteristics of a transformer employed rather than the transistor parameters.

The particular circuit described was evolved for the purpose of actuating a segregating mechanism in combination with a high speed scale wherein articles continuously pass over a scale pan and a flag on the beam of the scale permits light to fall on a photocell in one position and cuts off the light in another position. At the proper time, a pulse is produced by associated circuitry to detect whether the cell is light or dark and to actuate the segregating circuit accordingly. The circuit of the present invention serves the threefold purpose of amplifying the light from the cell, detecting whether it is above or below a certain level and remembering whether or not this predetermined threshold level has been exceeded. For convenience, the circuit is described in combination with such a photocell device, but it is obvious that the circuit can be used for other purposes and other forms of input can be employed.

Generally speaking, the invention is carried out by providing an emitter-coupled amplifier circuit having good temperature characteristics in combination with a blocking oscillator circuit which is normally biased to cut off and supplying a pulse to the blocking oscillator circuit, making it conductive. Since this circuit is driven to saturation, the output will depend on the characteristics of the associated transformer and the voltage across it, rather than on the characteristics of the particular transistor which is used. The circuit also includes a unijunction transistor memory device.

Figures 1, 2:
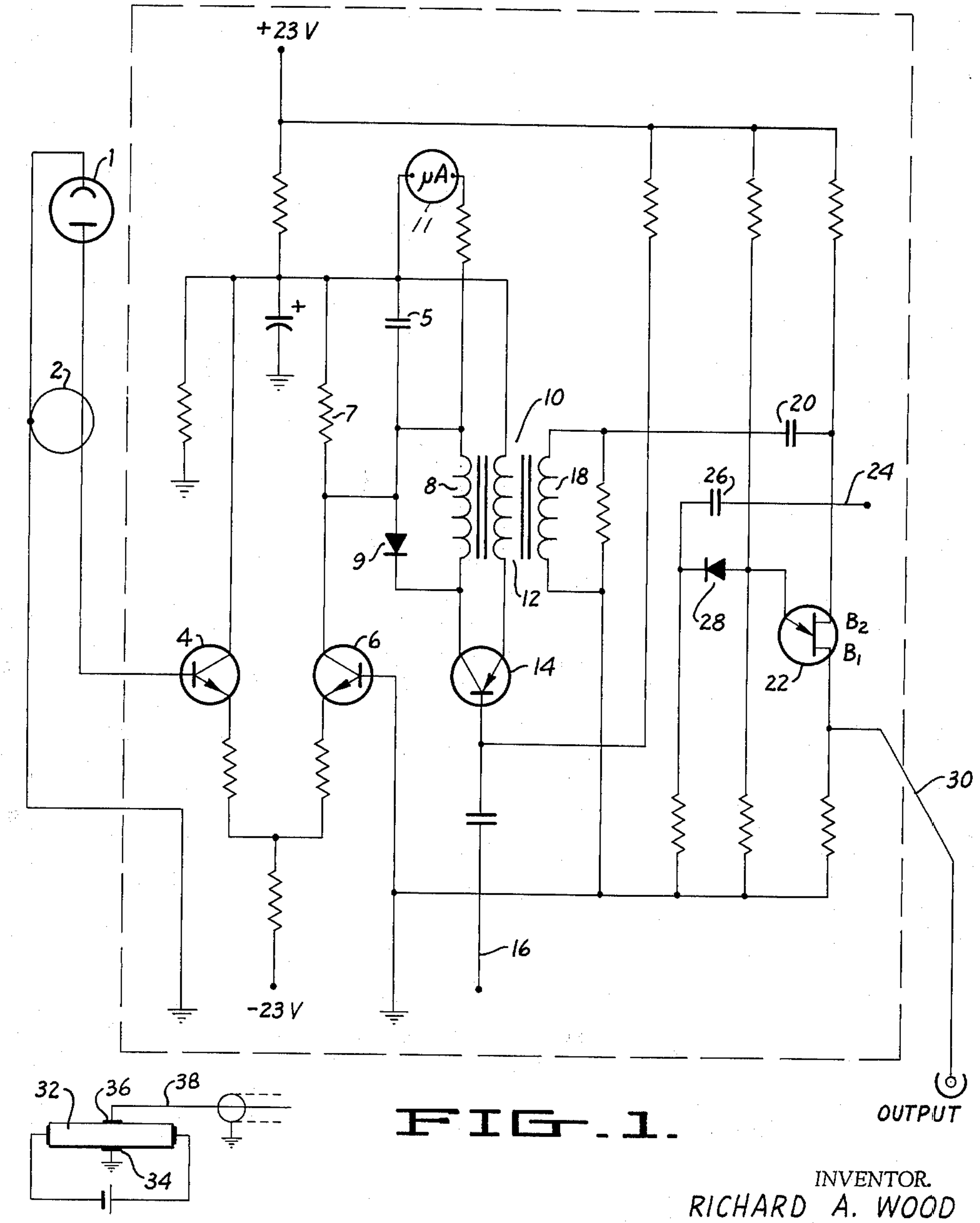
FIGURE 1 is a schematic diagram of a circuit embodying the present invention.
FIGURE 2 is a diagram of an alternate input circuit.

Referring now to the drawings by reference characters, a self-generating photocell 1 is connected by means of a coaxial cable 2 to the base of transistor 4. Transistor 4 is coupled to transistor 6 through their emitters, as is shown. The emitter-connected circuit gives good temperature stability since a change in ambient temperature will not appreciably change the overall gain of the two transistors. As the cell 1 goes dark, transistor 6 draws more current, increasing the voltage drop across resistor 7. This voltage is applied to the collector of transistor 14 through the primary 8 of transformer 10. This circuit may include a microameter 11 which is helpful in initially setting up the equipment but the microameter is not essential to the operation of the circuit and can be omitted. The primary 8 and secondary 12 of transformer 10 are connected to the collector and emitter, respectively, of transistor 14. The transistor 14 is normally cut off by its back bias so that application of voltage to the collector of the transistor does not result in any flow of current through the secondary 12 of transformer 10. If a negative pulse from a separate circuit is now passed to the base of transistor 14 from an external connection 16, transistor 14 will fire, causing saturation of transformer 10 and resulting in a pulse being produced in the tertiary winding 18 of transformer 10 which is proportional to the voltage developed across R–7 and is an analog of the voltage generated by photocell 1. This pulse is passed through the capacitor 20 through base 2 (B2) of transistor 22. Transistor 22 is a unijunction transistor having two bases and no collector. This type of transistor will conduct if a sufficiently large negative pulse is applied to base 2 (B2) and will continue to conduct until a counteracting pulse has been applied to the emitter. Further, this type of transistor will become fully conductive on a pulse above the threshold value so that the output is not proportional to the input. Thus, the transistor acts as both a level detector and memory device. Normally, transistor 22 is biased in a non-conducting condition and fires only when a pulse of sufficiently large negative magnitude is applied to the base 2 (B2) and continues to conduct until a negative voltage is applied to the emitter. In order to restore the circuitry to its previous state, a pulse is applied through connection 24 through capacitor 26 and diode 28 to the emitter of transistor 22. Output voltage from the circuit is taken from base 1 (B1) of transistor 22 through wire 30.

As has been previously mentioned, the circuit was designed primarily for use in connection with a weighing device wherein a continuously moving article is weighed on a scale and a circuit detects whether or not the article is of the proper weight and serves to actuate a segregating mechanism. Associated circuitry not forming a part of the present invention introduces a pulse through terminal 16 and this serves to detect and remember the level of illumination reaching photocell 1 and to either cause a signal or no signal on output terminal 30, depending upon the degree of illumination. If the signal is produced, the voltage will continue to be developed through terminal 30 until the turnoff pulse is delivered to the circuit through terminal 24.

The circuit includes a capacitor 5 which filters out transients while the diode 9 serves as a safety precaution to keep the kickback voltage from transformer 10 from the collector of transistor 14. The diode 28 is employed so that a positive pulse through 24 will not serve to render the transistor 22 conducting.

Other forms of input may be employed. For instance, in FIGURE 2 an input is shown employing the Hall effect. Here, a small voltage is applied to electrodes at the opposite ends of a wafer 32 of a semiconductor. Electrodes 34 and 36 are used to detect the strength of a magnetic field on the crystal and output voltage from 38 to the base of transistor 4 as previously described.

Although specific types of transistors and circuit values are given on the drawing, they are for illustrative purposes only and other transistors and circuit values can be substituted.

I claim:

1. A level detector and memory circuit comprising in combination a transistorized blocking oscillator circuit, said blocking oscillator circuit having a transformer with primary secondary and tertiary windings thereon, an input circuit to said blocking oscillator comprising a connection through the primary of said transformer to the collector of said transistor and a feed-back circuit from the primary to the secondary of said transformer to the emitter of said transistor, said tertiary winding having means to connect it to an output circuit, said transistor having means associated therewith to normally bias said transistor to cut off and said tertiary winding being connected to a unijunction transistor having a base one and a base two, means for applying a pulse through the base of the transistor of the blocking oscillator circuit whereby the pulse is produced in the tertiary of said transformer proportional to a voltage applied through said input circuit, means for applying said pulse from the tertiary winding to base two of said unijunction transistor, said unijunction transistor having a voltage divider circuit connected thereto to normally bias said transistor off, said transistor serving as a level detector and memory device whereby said unijunction transistor is caused to conduct or not conduct depending upon the level of the pulse produced in the tertiary of said transformer and means for applying a pulse to cause said unijunction transistor to cease to conduct.

2. The circuit of claim 1 wherein the input is through a two-transistor amplifier comprising two transistors having a common emitter connection.

References Cited by the Examiner

UNITED STATES PATENTS

| | | | |
|---|---|---|---|
| 2,858,438 | 10/58 | Merrill | 331—112 |
| 2,872,596 | 2/59 | Day et al. | 307—88.5 |
| 2,886,706 | 5/59 | Rogers | 331—112 |
| 2,900,508 | 8/59 | Tellman | 331—112 X |
| 2,906,893 | 9/59 | Mattson | 331—112 X |
| 3,033,996 | 5/62 | Atherton | 307—88.5 |

JOHN W. HUCKERT, *Primary Examiner.*

ARTHUR GAUSS, *Examiner.*